United States Patent [19]

Fraser

[11] Patent Number: 4,985,763
[45] Date of Patent: Jan. 15, 1991

[54] JET NOZZLE FOR PROPELLING AN APPARATUS ALONG A CONDUIT AND APPARATUS PROVIDED WITH SUCH A JET NOZZLE

[76] Inventor: Andrew A. Fraser, 5 Michelmersh Green, Bournemouth, Dorset, England, BH8 ONU

[21] Appl. No.: 409,968

[22] Filed: Sep. 18, 1989

Related U.S. Application Data

[63] Continuation of Ser. No. 277,770, Nov. 30, 1988, abandoned.

[30] Foreign Application Priority Data

Dec. 1, 1987 [GB] United Kingdom ............... 8728089

[51] Int. Cl.⁵ .................... H04J 7/18; B08B 3/00
[52] U.S. Cl. ............................ 358/100; 358/93; 358/106; 354/63; 239/747; 134/167 C; 15/104.12
[58] Field of Search .............. 358/93, 100, 106; 134/167 C, 168 C; 15/104.12; 354/63; 239/738, 747

[56] References Cited

U.S. PATENT DOCUMENTS

| 4,107,738 | 8/1978 | Van Norman | 358/100 |
| 4,154,447 | 5/1979 | Francis, Jr. et al. | 277/24 |
| 4,661,848 | 4/1987 | Matsuda | 358/100 |
| 4,677,997 | 7/1987 | Strauss | 15/104.12 |
| 4,764,180 | 8/1988 | Saddock | 134/167 C |

FOREIGN PATENT DOCUMENTS

| 400800 | 4/1966 | Fed. Rep. of Germany . |
| 1387673 | 4/1964 | France . |

*Primary Examiner*—John W. Shepperd
*Assistant Examiner*—Michael D. Parker
*Attorney, Agent, or Firm*—Renner, Otto, Boisselle & Sklar

[57] ABSTRACT

A jet nozzle for use in propelling a trolley or sledge provided with a television or video camera along a conduit, such as a sewer, for use in inspecting the interior of the conduit, the jet nozzle comprising a casing having an end wall provided with a plurality of discharge openings communicating with a chamber formed between said end wall and a transverse wall, an inlet in communication with the chamber and connected to a home, a bearing provided on the casing mounting a connector member for connecting the jet nozzle to the trolley or sledge and allowing the casing to rotate relative to the connector member.

13 Claims, 1 Drawing Sheet

JET NOZZLE FOR PROPELLING AN APPARATUS ALONG A CONDUIT AND APPARATUS PROVIDED WITH SUCH A JET NOZZLE This is a continuation of co-pending application Ser. No. 07/277,770, abandoned, filed on Nov. 30, 1988.

SUMMARY OF THE INVENTION

This invention relates to a jet nozzle for propelling an apparatus along a conduit and to an apparatus provided with such a jet nozzle. Particularly, but not exclusively, the jet nozzle is used for propelling a camera carrying apparatus along a conduit, such as a sewer, for use in inspecting the interior of the conduit.

It is known to propel a television-camera-carrying apparatus along a sewer by means of a water jet nozzle supplied with water under pressure through a hose, the jet nozzle being connected to the hose by a rigid connector and connected to the camera carrying apparatus by a swivel pin connector. Such an arrangement is disclosed in U.S. Pat. No. 4,107,738.

A disadvantage of the known apparatus is that the swivel pin can jam due to debris, friction and/or wear and any torque applied to the hose can be applied to the camera-carrying apparatus causing it to tip or turn over.

Another disadvantage of the known apparatus is that the water jet is discharged at an angle and impinges on the internal surface of the sewer and under certain conditions can create a vacuum in the sewer upstream of the jet nozzle, and any water in the conduit is disturbed by the vacuum and creates a mist or spray in front of the camera lens, thus preventing the camera from producing a clear picture of the interior of the conduit.

According to the present invention in one aspect there is provided a jet nozzle for use in propelling apparatus along a conduit, comprising a casing having at one end an end wall, a transverse wall spaced from said end wall and defining with said casing and said end wall a chamber, a plurality of openings in said end wall communicating with said chamber, an inlet in communication with said chamber, means for connecting a hose to said inlet, a bearing provided on said casing at the side of said transverse wall remote from said chamber, and a connector member for connecting the jet nozzle to said apparatus mounted by said bearing for rotation relative to said casing and extending from the other end of said casing.

Preferably the connector member is provided with a radially outwardly extending flange which closes the other end of said casing.

A transverse outwardly-directed peripherally-extending deflector member may be provided on the casing or on the connector member.

Preferably the discharge openings are axially extending.

According to the present invention in another aspect there is provided a camera-carrying apparatus which can be moved along a conduit, comprising a wheeled trolley or a sledge provided with skids, a camera mounted on the trolley or sledge and a jet nozzle connected by a connector member to the rear end of said trolley or sledge, said jet nozzle comprising a casing having at one end an end wall, a transverse wall spaced from said end wall and defining with said casing and said end wall a chamber, a plurality of openings in said end wall communicating with said chamber, an inlet in communication with said chamber, means for connecting a hose to said inlet, a bearing provided on said casing at the side of said transverse wall remote from said chamber, said connector member being mounted by said bearing for rotation relative to said casing and extending from the other end of said casing.

BRIEF DESCRIPTION OF THE DRAWINGS

To the accomplishment of the foregoing and related ends, the invention then comprises the features fully hereinafter described and particularly pointed out in the claims, the following description and annexed drawings setting forth in detail some illustrative embodiments of the invention, these being indicative however of only some ways in which the principle of the invention may be employed.

In said annexed drawings.

DESCRIPTION OF THE PREFERRED EMBODIMENTS

Figure 1:
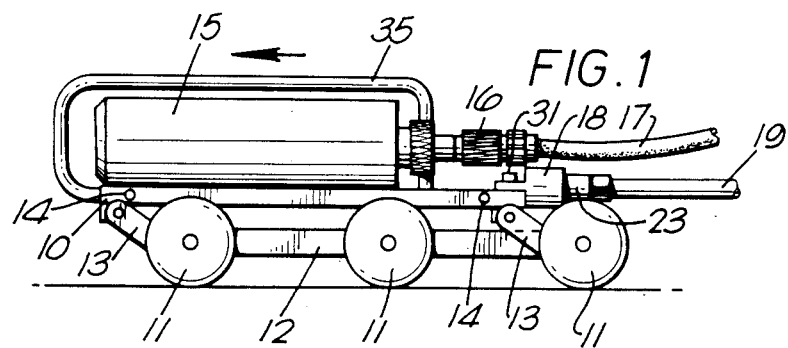
FIG. 1 is a diagrammatic side elevation of a camera carrying apparatus provided with a jet nozzle embodying the present invention.
Figure 2:
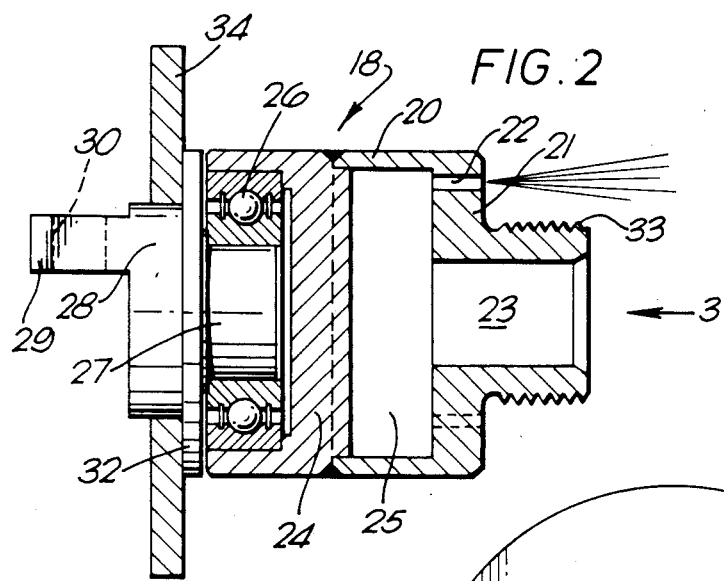
FIG. 2 is a longitudinal section of the jet nozzle.
Figure 3:
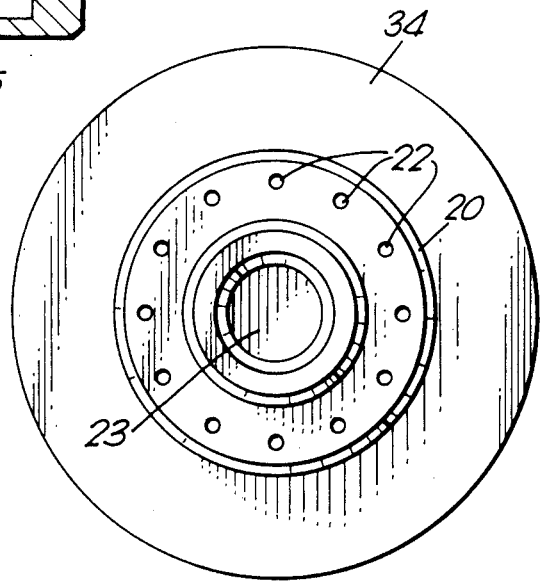
FIG. 3 is a rear view of the jet nozzle taken in the direction of arrow 3 indicated on FIG. 2.

The apparatus shown in FIG. 1 comprises a trolley 10 provided with wheels 11 mounted on a member 12 which is connected to the trolley 10 by hinged levers 13. Provided on the trolley 10 are axles 14. In order to reduce the height of the trolley 10 the member 12 and levers 13 can be disconnected from the trolley 10 and the wheels 11 mounted on the axles 14.

Mounted on the trolley 10 is a television camera 15 whose lens face forwardly and the camera 15 is connected by a connector 16 to a cable 17 which at its other end is connected to a remote monitor (not shown), the cable 17 passing around a rotatable drum (not shown). Connected to the trolley 10 is a jet nozzle 18 which has a hose 19 connected to it through which fluid under pressure is supplied to the jet nozzle 18. The trolley 10 is propelled in the direction of the arrow shown in FIG. 1. In use of the apparatus the trolley 10 is propelled along a conduit, such as a sewer, and the picture taken by the camera of the interior of the conduit is viewed on the monitor.

The jet nozzle 18 comprises a casing 20 having an end wall 21 provided with an annular array of discharge openings 22 and an inlet 23. Formed between the end wall 21 and a spaced transverse wall 24 is a chamber 25 in communication with the openings 22 and inlet 23. Provided within the casing 20 and located at the other side of the wall 24 is a bearing 26. Received within the bearing 26 is a circular part 27 of a connector member 28 having an axially extending flange 29 provided with a hole 30 through which can extend a pin 31 provided on the trolley 10. The connector member 28 is provided with a radially outwardly extending flange 32 which closes the adjacent end of the casing 20 and prevents the ingress of debris into the bearing 26. The discharge openings 22 are axially extending. The inlet 23 is connected to the hose 19 by a connector 33. If in use of the apparatus any torque is applied to the hose 19 then the casing 20 will rotate relative to the connector member 28 through the bearing 26 and such torque will not be transmitted to the trolley.

A removable or fixed flexible or rigid transverse outwardly-directed peripherally-extending deflector member 34 can be provided on the connector member 28. Alternatively, the deflector member 34 can be provided on the casing 20. If a vacuum is created in the conduit by the nozzle 18 the deflector member 34 prevents the vacuum acting on any water forwardly of the camera 15.

The jet nozzle 18 is preferably supplied with water under pressure but alternatively, the jet nozzle 18 may be supplied with a gas, such as air, under pressure.

The camera 15 may comprise a video camera if desired.

By deflecting the propulsive fluid axially it does not impinge on the wall of the conduit and reduces the tendency of producing a vacuum upstream of the nozzle 18.

Instead of the trolley 10 being provided with wheels 11 it can be provided with skids and thus comprise a sledge.

The trolley 10 is provided with a bar or bars 35 which protect the camera 15 from damage should the trolley 10 turn over and during ascent or descent in a man-hole or other access to a drain or sewer.

The bearing 26 may be provided on the exterior of the casing 20 and the bearing 26 may comprise a plain bearing, e.g. two surfaces in sliding contact with each other.

The openings 22 may be inclined if desired.

In an alternative arrangement the casing 20 may be detachable from the connector member 28 so as to be capable of being propelled along a conduit without being connected to the trolley 10 in order to clean the conduit.

It will be appreciated that many modifications and changes can be made without departing from the scope of the appended claims.

I, therefore, particularly point out and distinctly claim as my invention:

1. A jet nozzle for use in propelling apparatus along a conduit, comprising a casing having at one end an end wall, a transverse wall spaced from said end wall and defining with said casing and said end wall a chamber, a plurality of openings in said end wall communicating with said chamber, an inlet in communication with said chamber, means for connecting a hose to said inlet, a bearing provided on said casing at the side of said transverse wall remote from said chamber, and a connector member for connecting the jet nozzle to said apparatus mounted by said bearing for rotation relative to said casing and extending from the other end of said casing.

2. A jet nozzle as claimed in claim 1, in which a radially outwardly extending flange is provided on said connector member, said flange closing off the said other end of said casing.

3. A jet nozzle as claimed in claim 1, in which a transverse outwardly-directed peripherally-extending deflector member is provided on said casing.

4. A jet nozzle as claimed in claim 1, in which a transverse outwardly-directed peripherally-extending deflector member is provided on said connector member.

5. A jet nozzle as claimed in claim 1, in which said discharge openings are axially extending.

6. A jet nozzle as claimed in claim 1, in which said casing is detachable from the connector member.

7. A camera-carrying apparatus which can be moved along a conduit, comprising a wheeled trolley or a sledge provided with skids, a camera mounted on the trolley or sledge and a jet nozzle connected by a connector member to the rear end of said trolley or sledge, said jet nozzle comprising a casing having at one end an end wall, a transverse wall spaced from said end wall and defining with said casing and said end wall a chamber, a plurality of openings in said end wall communicating with said chamber, an inlet in communication with said chamber, means for connecting a hose to said inlet, a bearing provided on said casing at the side of said transverse wall remote from said chamber, said connector member being mounted by said bearing for rotation relative to said casing and extending from the other end of said casing.

8. A camera-carrying apparatus as claimed in claim 7, in which a radially outwardly extending flange is provided on said connector member, said flange closing off said other end of said casing.

9. A camera-carrying apparatus as claimed in claim 7, in which a transverse outwardly-directed peripherally-extending deflector member is provided on said casing.

10. A camera-carrying apparatus as claimed in claim 7, in which a transverse outwardly-directed peripherally-extending deflector member is provided on said connector member.

11. A camera-carrying apparatus as claimed in claim 7, in which said trolley is provided with wheels mounted on a member connected to the trolley by hinged levers.

12. A camera-carrying apparatus as claimed in claim 11, in which the trolley is provided with axles on which the wheels can be mounted when said member and levers are disconnected from the trolley.

13. A camera-carrying apparatus as claimed in claim 7, in which the trolley or sledge is provided with at least one bar for protecting the camera.

* * * * *